United States Patent [19]

Duchstein

[11] 4,310,552

[45] Jan. 12, 1982

[54] CASTING PERLITE BEFORE THE SWINE

[76] Inventor: Siegfried Duchstein, Oschenberg, 8580 Bayreuth, Fed. Rep. of Germany

[21] Appl. No.: 52,316

[22] Filed: Jun. 26, 1979

[30] Foreign Application Priority Data

Jun. 27, 1978 [AT] Austria .................................. 4659/78

[51] Int. Cl.$^3$ ................................................ A23K 1/00
[52] U.S. Cl. ......................................... 426/2; 426/74; 426/623; 426/630; 426/807; 71/21; 71/64 F; 71/64 G; 71/64 SC
[58] Field of Search .................... 426/2, 74, 807, 623, 426/630; 71/21, 64 F, 64 G, 64 SC

[56] References Cited

U.S. PATENT DOCUMENTS

| | | | |
|---|---|---|---|
| 2,486,426 | 1/1953 | McGaha | 426/807 X |
| 2,779,670 | 1/1957 | Burkett | 71/64 G |
| 2,904,424 | 9/1959 | Chapman et al. | 71/64 G X |
| 3,174,845 | 3/1965 | MacArthur | 71/64 G X |
| 3,836,676 | 9/1974 | Komakine | 71/64 G X |
| 3,846,559 | 11/1974 | Stevens | 426/56 |
| 3,846,567 | 11/1974 | Matyas et al. | 426/623 X |
| 3,875,319 | 4/1975 | Seckler | 426/431 |

OTHER PUBLICATIONS

Acs et al., "Feed Additive Concentrates, Especially for Poultry", Cited in Chemical Abstracts, (1977), Abstract No. 87:66881r.

Handbook of Chemistry & Physics Published by CRC Press, 55th Edition, 1974–1975, p. F-147.

*Primary Examiner*—R. B. Penland
*Attorney, Agent, or Firm*—Karl F. Ross

[57] ABSTRACT

A swine, hog and pig fodder which comprises the customary digestible meal or grain component, e.g. soy or bran meal, in combination with an indigestible blown perlite additive with a particle size up to 5 mm and preferably between 0 and 2 mm. The fodder can contain 10 to 50 volume % blown perlite which may store in its open-pore structure physiologically or medicinally effective substances such as medicaments, trace elements essential to nutrition and vitamins.

2 Claims, No Drawings

CASTING PERLITE BEFORE THE SWINE

FIELD OF THE INVENTION

The present invention relates to the feeding of pigs, hogs and swine, particularly as meat animals, and, more particularly, to a swine fodder or animal-food composition. The invention also relates to a method of feeding swine and to a fertilizing method or a method of producing fertilizer.

BACKGROUND OF THE INVENTION

In the art of animal husbandry and particularly in the feeding of swine, it is known to provide so-called ad libitum fodders or hog-feed compositions which contain indigestible extender components in the form of particles or granules.

The indigestible additive generally is foamed and granulated synthetic resin with a particle size upwards of 5 mm which is used to establish a predetermined bulk weight of the fodder or food composition, which increases the bulk of the food product and which does not detrimentally affect the digestive process as much as possible.

The problems involved in preparation of such fodders, i.e. fodders containing foamed and granular synthetic resins of the indicated particle size range, are those which are associated with separation of the components of the feed mixture, the problems of handling and manufacturing the animal feed because of the increase in volume resulting from the use of the additive, and problems which are associated with the dispersal of the animal dung.

However, when synthetic-resin materials are used, it is not possible to exclude detriment to the digestive tract and thus the health of the animal which, of course, affects the quality of the meat because unreacted chemical components of the synthetic resin, softeners and plasticizers may leach or otherwise be solubilized from the synthetic-resin materials.

In addition, the synthetic-resin additives may have a pH value or, in the digestive tract may produce a pH value, e.g. in the highly acid range, which is detrimental.

Difficulties have also been found to arise with the use of such additives when the excrement and urine of the swine are to be utilized as fertilizer and dispersed on the fields. The granular additives of foamed synthetic resin are not easily decomposed and this applies whether the dung is applied in a dry state or wet.

While it is true that some granular porous foamed synthetic resins are desirable in loosening the soil, they have scarcely any water storage capabilities and thus do not even have the capacity of absorbing valuable fertilizer components for releasing them gradually to the fields. This may be a result of the hydrophobic character of the synthetic resin and/or a closed pore structure as is usually provided.

OBJECTS OF THE INVENTION

It is the principal object of the present invention to provide an improved animal-feed composition for swine which avoids the disadvantages of earlier swine fodders or feeds and which promotes nontoxic ingestion of the fodder and evacuation of excrement, while faciliting the use of the swine dung for field fertilizer.

Another object of the invention is to provide an improved ad libitum fodder which eliminates the disadvantages encountered with foamed synthetic-resin additives without interfering with digestion and without detriment to the health of the swine, while at the same time eliminating fertilizer problems encountered with earlier fodder additives.

Yet another object of the invention is to provide an improved method of feeding swine.

DESCRIPTION OF THE INVENTION

These objects and others which will become apparent hereinafter, are attained in accordance with the present invention, which makes use of a swine or hog-feed composition or fodder which consists of the usual digestible swine-fodder components, especially grain and soy meal (including bran meal) together with a porous granular additive consisting of blown perlite with a particle size up to 5 mm and preferably up to 2 mm. Reference will be made hereinafter to particle size between 0 and 5 mm or between 0 and 2 mm and it is intended in each case to utilize a uniform spectrum of particle size ranging from the smallest customarily present in producing blown perlite, e.g. 0.01 mm particle size, to the maximum as indicated. The blown perlite, of course, is an indigestible additive to the swine fodder and especially to ad libitum hog feeds of the invention.

According to a further feature of the invention, the particle size range of the blown perlite is mostly 0 to 1 mm and corresponds to the particle size range of the meal of the usual finished swine fodder to which it is added so that the composition will contain 10 to 50 volume % of the blown perlite particles.

According to a further feature of the invention, the open pore blown perlite is charged, prior to admixture with the digestible components of the swine feed, with physiologically or medicinally effective substances such as trace elements and/or vitamins. The structure of the perlite grains ensures that these additives will be retained until the composition reaches the digestive tract and allows a highly precise dosage of the additive to be supplied to the animals.

A surprising advantage of the use of perlite in accordance with the present invention, in the finished swine fodder, is that there is little influence of the additive, even when used in large volume proportion, on the bulk weight apparently because the fine-grained fraction of the perlite fills the rough and broken surface of the digestible fodder components, especially grit and bran and/or soy meal while, conversely, the foamed meal components of the digestible portion fill the open pores of the perlite.

In other words after intensive mixing and blending of the digestible and indigestible components of the fodder, the composition has a relatively low volume and hence the composition can be handled easily with conventional machinery and techniques.

The digestion of the fodder composition of the present invention by the swine, is not adversely affected, but rather the perlite additive appears to contribute to an improvement in the health of the animal. Not only is perlite a "natural" substance, in the sense that it is a naturally occurring mineral, but investigations have shown that its persence in the digestive tract improves the overall digestion process. Nothing detrimental is set free from the perlite which, having been expanded at a temperature of about 1100° C., is sterile and chemically neutral. The pH value is between 6 and 7.5 and its sterility allows long-term storage of the finished composition, i.e. the blend of the comestible and perlite components.

An important advantage of the system of the present invention is that the perlite, during the passage through the digestive tract of the swine, by capillarity, picks up a substantial fertilizer capability which transforms the perlite into an excellent crop fertilizer for plants of practically any type.

In fact, investigations have demonstrated that the perlite picks up an extremely high concentration of nutrients and oxygen, such that up to 50% by volume of the excreted perlite may consist of nutrients in capillary-trapped aqueous solution. Within the perlite granules themselves there appears to occur an aerobic decomposition or degradation which promotes the effectiveness of the excreted perlite as a fertilizer. The decomposition has the character of fermentation which eliminates acrid, toxic or corrosive components.

The dung which results from the use of the fodder composition of the present invention has a substantially uniform consistency since the perlite additive appears to take up any excess water. The pasty mixture can be subjected to additional aeration to produce a dry fertilizer which can be distributed easily and uniformly on the fields.

However, additional water may be added to the pasty mixture to permit the latter to be processed and used like liquid fertilizer. Advantages in fertilizer technology, using the system of the present invention, are also gained in the solid fertilizer chain which normally required the addition of large quantities of straw to the excrement. Heretofore the excrement built up in layers, with added straw, until mechanical cleaning devices removed the mixture from the stall. The mechanical operations were also required to loosen the piles of composting fertilizer to allow access of oxygen and increased fermentation and decomposition by aerobic bacterial action. In this chain, however, considerable volatile nitrogen was lost. When perlite is present as with the system of the present invention, the loss of nitrogen is minimized.

Furthermore, the perlite granules function as nutrient carriers to the plants when the fertilizer is applied to the ground and indeed the perlite particles delay leaching of potassium and nitrogen compounds from the fertilizer. Experiments have shown that at least some of the nutrients are retained until the nutrients of the plants approach the perlite particles, whereupon these nutrients are extracted.

Thus the perlite particles act as delayed-release and sustained-release agents.

The perlite particles, of course, also serve to loosen the soil and as water-storing agents.

In fact, long term application of fertilizers containing the expanded perlite and derived from swine excrement, has been found to improve the soil since the perlite remains as a nondecomposable mineral and does not loose its water-retaining and soil-loosening properties even with mechanical comminution in the conventional soil preparation.

It has also been found that the usual reduction in quality of the flesh of the animal long associated with the use of indigestible additives in swine feed, does not occur. The reduction in the quality of the meat is observable as a reduction in coloration and an increase in the water content of the most valuable cuts.

When however, swine are fed with the composition of the present invention and slaughtered, the flesh of these animals has a firmer touch and better color.

According to a feature of the invention, the excrement and urine mixture can have further quantities of blown perlite added thereto to affect the consistency and the nutrient-storage capabilities of the resulting fertilizer.

In summary, the system of the present invention has a number of advantages, for example, in the handling and preparation of the fodder or feed, with respect to the effect in the digestive tract of the swine, with respect to the health of the animals and the flesh quality and with respect to the fertilizer technology. Optimum results are obtained with 25% by volume blown perlite in a particle size range of 0 to 2 mm, the balance of the mixture being equal parts of bran and soy meal.

I claim:

1. A method of both improving field fertilization and the quality of the flesh of hogs raised for slaughter, comprising the steps of:
    (a) admixing a digestible hog-feed meal including bran or soy meal with 10 to 50 volume percent of blown perlite of a particle size up to 5 mm and intensively blending the resulting composition;
    (b) directly administering said composition ad libitum to hogs raised for slaughter thereby improving the quality of the flesh thereof and producing hog waste in the form of excrement containing excreted perlite; and
    (c) fertilizing a crop-producing field with said waste.
2. The method defined in claim 1, further comprising the step of:
    (d) combining said perlite with physiologically or medicinally effective substances selected from the group which consists of trace elements and vitamins prior to admixture with said meal.

* * * * *